No. 667,542. Patented Feb. 5, 1901.
J. E. LYTLE.
ACETYLENE GAS GENERATOR.
(Application filed Apr. 30, 1898. Renewed Dec. 29, 1900.)
(No Model.) 5 Sheets—Sheet 1.

Fig.1.

Witnesses
Inventor
By his Attorney

No. 667,542. Patented Feb. 5, 1901.
J. E. LYTLE.
ACETYLENE GAS GENERATOR.
(Application filed Apr. 30, 1898. Renewed Dec. 29, 1900.)
(No Model.)
5 Sheets—Sheet 3.

No. 667,542. Patented Feb. 5, 1901.
J. E. LYTLE.
ACETYLENE GAS GENERATOR.
(Application filed Apr. 30, 1898. Renewed Dec. 29, 1900.)
(No Model.) 5 Sheets—Sheet 4.

Witnesses
Inventor
By his Attorney

No. 667,542. Patented Feb. 5, 1901.
J. E. LYTLE.
ACETYLENE GAS GENERATOR.
(Application filed Apr. 30, 1898. Renewed Dec. 29, 1900.)
(No Model.) 5 Sheets—Sheet 5.

Witnesses.
J. B. McGivr.
G. Davenport.

Inventor.
James E. Lytle
By H. A. West
Attorney.

UNITED STATES PATENT OFFICE.

JAMES E. LYTLE, OF CLEVELAND, OHIO, ASSIGNOR TO THE NATIONAL ACETYLENE GAS COMPANY, OF SAME PLACE.

ACETYLENE-GAS GENERATOR.

SPECIFICATION forming part of Letters Patent No. 667,542, dated February 5, 1901.

Application filed April 30, 1898. Renewed December 29, 1900. Serial No. 41,494. (No model.)

*To all whom it may concern:*

Be it known that I, JAMES E. LYTLE, a citizen of the United States, and a resident of Cleveland, in the county of Cuyahoga and State of Ohio, have invented certain new and useful Improvements in the Manufacture of Acetylene Gas, of which the following is a specification.

This invention relates to apparatus for manufacturing the gas known as "acetylene" by the mutual action of calcium carbid and water and supplying the same to service-pipes for distribution for illuminating purposes over residences, factories, office and other buildings, and cities. In devices used for this purpose one most important point is to generate the gas continuously as it is being consumed, so as to avoid the necessity of an excessive amount of storage-room and secure uniform pressure of the gas. In some of the existing devices an approximation to this is attempted by dropping successive portions of calcium carbid into a vessel of water, and in most other devices prior to my invention a better approximation is obtained by feeding the water into a vessel of calcium carbid, conducting the gas therefrom to a gas-holder of the usual construction, and utilizing the motion of the upper member of the gas-holder to regulate the flow of water to the carbid. In short, the moving member in its descent when it reaches a certain predetermined point opens the water-valve and allows water to flow into the carbid chamber or generator and there generates gas to supply the place of that which some time previously has been drawn from the holder. There are two objections to this method of regulation: First, the replenishing of the gas-holder by entrance of gas occurs so long after the drawing off of gas which causes it that there is considerable variation in the position of the upper member of the holder, with consequent waste of the room which it occupies, as well as some variation in the pressure of the gas, and, secondly, it frequently happens that after the carbid in the generator has been entirely exhausted the drawing off of the gas from the holder is stopped for the night when the moving member of the holder is in position to feed water to the generator. Consequently water flows into the generator all night, accumulating sufficiently to cause considerable trouble when it is opened for the purpose of replenishing and sometimes even overflowing from the generator into the gasholder and causing further trouble there.

One of the objects of my invention is to regulate the feeding of the water to the generator directly by the flow and consumption of the gas, and thus avoid the objections above described.

Other objects are to provide a generator of considerable capacity, and thus avoid frequent replenishing, to feed the water to that part of the generator where or near where the separation and discharge of the lime residue or "ash" (as it is frequently and will for convenience hereinafter be called) is effected in order to facilitate separation and discharge of said ash, to provide easy and ample means of effecting the separation and discharge of the ash and effective means for distributing the water over all parts of the carbid and for drying and purifying the gas, means of reducing to a minimum the escape of residual gas into the air during replenishing of the generator, and facilities for emptying the ashpit quickly.

The general means by which I obtain the first-named object are the throttling of the gas, by means of a suitable stop-cock or valve, as it flows from the generator to the holder, thus producing a difference in pressure of the gas on the two sides of the cock, the utilization of this difference in pressure to lift a column of water to a height at which it overflows, and the conduction of this overflow to the generator.

The general means by which I effect the distribution of the water on the carbid and the separation and discharge of the ash are the use of a conical vessel to contain the carbid and having a grated bottom and preferably grated sides, means of revolving the cone on its axis, which is vertical, and means of dropping the water on the sides of the cone.

Another feature of my invention comprises means for relieving the apparatus of overpressure of gas in case such a contingency should arise from any accident or omission on the part of the attendant or in consequence of any possible failure in any part of the apparatus to perform its work properly. This and my other improvements pointed out in the claims will now be described in detail with relation to the accompanying drawings, in which—

Fig. 5 is a plan, Fig. 6 an elevation, and Fig. 7 a section, of another form of gas-tight door. Fig. 8 is an inverted plan of the box connecting the two parts of the generator. Fig. 9 is a horizontal and Fig. 10 a vertical section through the water-feed-regulating valve. Fig. 12 is a vertical section, and Fig. 13 a horizontal section, of an alternative construction of the water-feed chamber and its connections.

Figure 1:
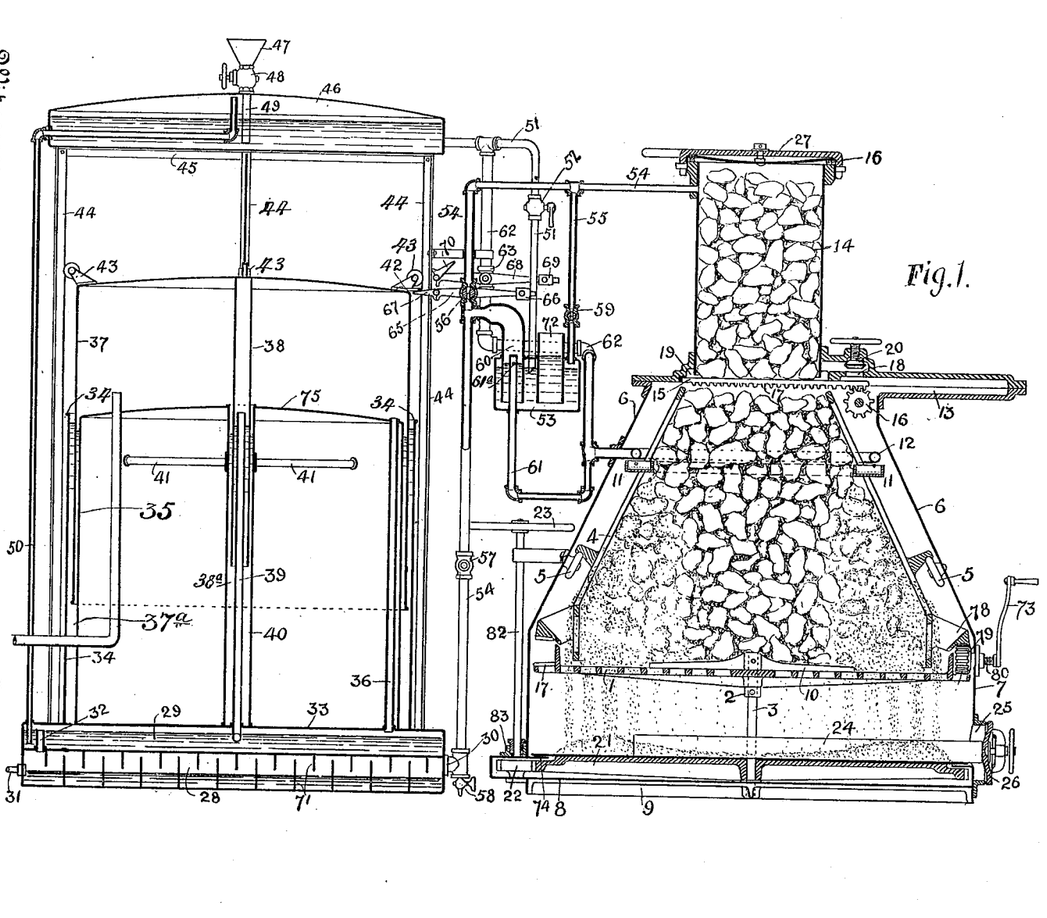
Figure 1 is a vertical section of the complete apparatus.
Figure 2:
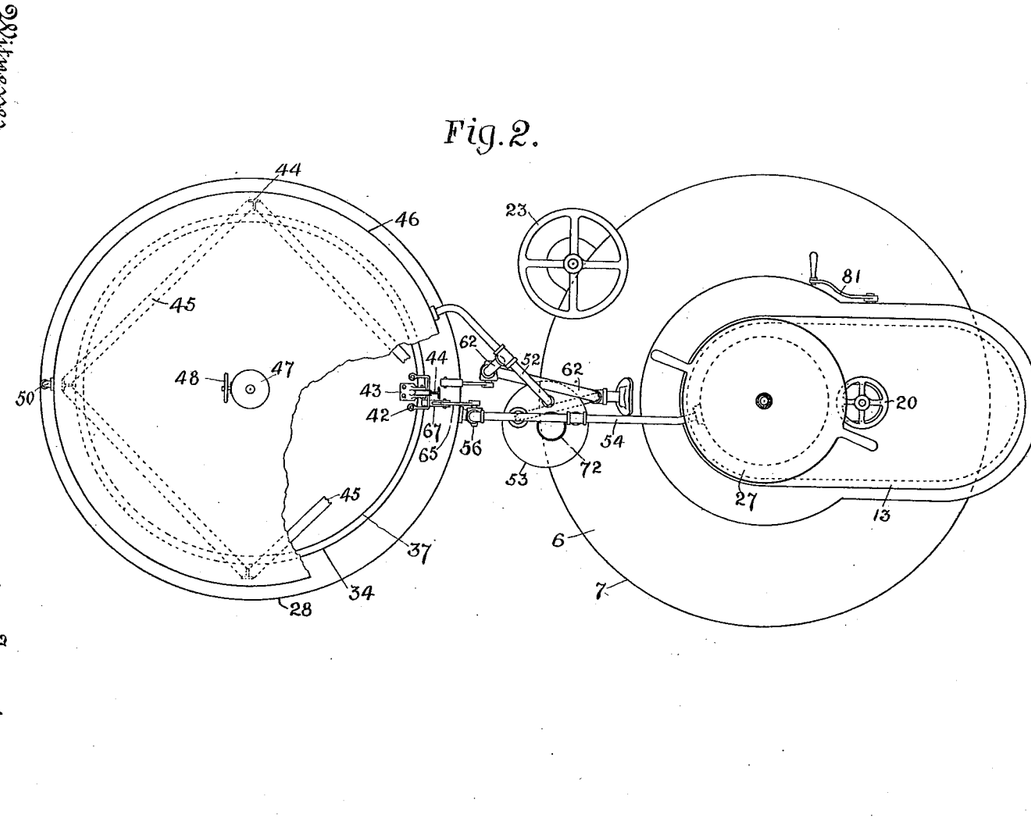
Fig. 2 is a plan of the same.

Referring to Figs. 1 and 2, the generator is shown on the right-hand side of the drawings, the gas-holder on the left-hand side, and the connections and water-feed-regulating apparatus between the two.

1 is a grating, preferably circular in form, capable of revolving on its vertical axis and supported by the collar 2 on the fixed vertical shaft 3, on which the grating is adapted to revolve in a horizontal plane.

4 is a conical grating, in this case made separate from the above-mentioned grating 1 and supported above the said grating 1, preferably by the rollers 5 5. These two gratings form the main carbid-receptacle and are inclosed by a conical gas-tight casing 6, which is continued downward in cylindrical form at 7 to form the ash-pit sides. The ash-pit bottom 8 is carried by a spider 9, to which is also fixed the vertical shaft 3, and at the top of this vertical shaft is a curved cross-arm 10, lying on the bottom of the generator or grating 1 and the function of which is to sweep any undecomposed carbid which reaches the bottom at or near the center toward the sides, where it will come into the path of the trickling water and be utilized.

Carried by and preferably cast with the conical grating 4 is an annular trough 11, formed with perforations in its inner wall which projects far enough outside to catch the water which drops from the annular feed-pipe 12 and which projects far enough inside the grating to carry the water to the carbid inside rather than allow it to follow down the conical surface of the grate and avoid doing its full work. In place of the trough I may employ any proper water-distributer.

The conical casing 6 is surmounted by a shallow box 13, through which is the connecting-opening between the lower or main carbid-holder and an upper cylindrical carbid-holder 14. This box incloses a sliding horizontal trap or door 15, adapted to open and close the bottom of the upper holder 14. This door 15 is actuated by pinion 16, gearing into a rack 17 on the lower side of the said door. There is also communication from the lower to the upper portion of the carbid holder or generator by way of the small opening 18 and annular space 19, and the said communication is closed and opened at will by means of the by-pass valve 20. The upper cylindrical portion 14 of the generator is closed gas-tight by means of a removable door 27, (shown in detail in Figs. 5, 6, and 7,) pressing on a rubber washer 16.

The circular grating 1 is toothed on its edge at 17 to form a bevel horizontal wheel, and the upper or conical holder is toothed similarly on an outwardly-projecting rim 78 to form a similar bevel-wheel, but inverted, and gearing with these two bevel-wheels is a bevel-pinion 79, carried by shaft 80, which projects through the casing 7 and whose outer end is made square to fit the eye of a crank-handle 73, by which it can be actuated. The pinion 16, which actuates the sliding door 15, is similarly carried by a shaft projecting through the casing and having a square outer end fitting the hub of a crank-handle 81, as shown in Fig. 2.

Figure 3:
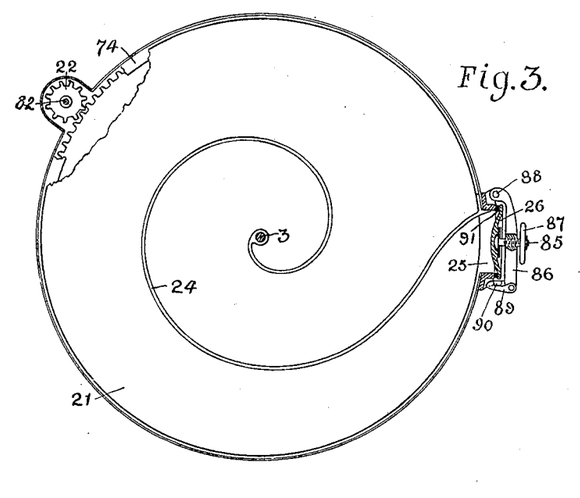
Fig. 3 is a sectional plan of the ash-pit, showing the means for discharging the ash and one of the gas-tight doors.

21 is a revoluble false bottom to the ash-pit, consisting, essentially, of a toothed wheel running loose on the vertical shaft 3 and covered on its upper face by sheet-iron. As shown in Fig. 3, it gears with a toothed pinion 22, the shaft 82 of which, Fig. 1, passes through the casing by way of a gas-tight stuffing-box 83 and is actuated by a hand-wheel 23. 24 is a deflecting or discharging plate of approximately spiral shape, attached at its inner end to the shaft 3 and fixed at its outer end to the casing 7 at the discharge-opening 25, which is fitted with a gas-tight removable door 26 (shown in detail in Figs. 3 and 4) and hereinafter described with reference to those figures.

The management and operation of the generator are as follows: Assuming that it has already been in use, but is exhausted of carbid, it contains residual gas, which it is desirable to prevent as far as is possible escaping into the air, and a certain amount of ash in the ash-pit. The ash-pit is made sufficiently large to contain the ash of several charges, and when it is only necessary to recharge it with carbid the gas-cock 57 is first closed to prevent the gas backing into the generator from the gas-holder. The door 15 is then moved to close the bottom of chamber 14, and the by-pass valve 20 is closed to cut off communication between the two parts of the carbid-holder. The top door 27 is then opened, and the upper chamber 14 is filled with carbid. The door 27 is then closed, and the slide-door 15 is opened to allow the carbid in the chamber 14 to fall upon the grating 1. This whole operation is repeated until the conical chamber is full of carbid. The sliding door 15 is then closed, the chamber 14 refilled with carbid, the top door 27 closed, and the by-pass valve opened, when the generator is ready for operation.

When the ash-pit requires emptying, the door 26 is open and the hand-wheel 23 is turned to the right. This turns the false bottom 21 of the ash-pit to the left hand, carrying the ash around against the curved incline of the deflecting-plate 24, which presses it constantly outward and discharges it through the doorway 25. The casing 7 carries an inwardly-projecting shelf or ledge 74, which serves to prevent the ash from falling down between the casing 7 and outer edge of the false bottom 21.

Figure 15:
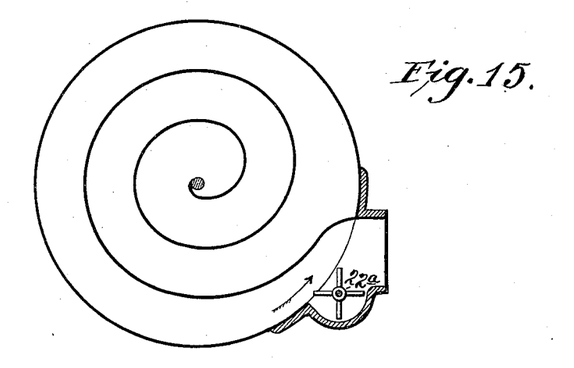
Fig. 15 is a plan view of a modified form of ash-discharger.

In the form of construction shown in Fig. 15 the pinion 22 and its operating-shaft 82 are located adjacent to the doorway 25, and on said shaft 82 is secured an ash-discharge wheel 22$^a$, which forcibly ejects the ashes through the door and obviates all tendency of congestion at the mouth of the discharge.

The gas-holder comprises a base portion for cooling and purifying the gas, a gas-holder proper with guides, and a water-storage system at the top supported by said guides. The base portion consists of a lower shallow pan 28, containing water, and an upper shallow pan 29, also containing water. The lower pan has an inlet 30 for gas above the water-level and a number of vertical partitions 71 alternately projecting from the bottom and from the top, the latter reaching down to very near the water-surface, which is preserved at an approximately definite and constant level by means of occasional replenishing and an overflow-outlet 31. The top of the lower pan forms the bottom of the upper pan, and through this projects, at the side opposite to the gas-inlet 30, a short pipe 32, reaching to the surface of the water in the upper pan 29 and forming a passage for gas from the lower to the upper pan and for overflow-water from the upper to the lower pan, the water in the upper pan being also kept at an approximately constant level similarly to that in the lower pan.

The top sheet 33 of the upper pan forms the bottom of the lower or fixed member of the gas-holder proper, which consists, essentially, of a cylindrical vessel 34, containing water; but I prefer to confine the water to a small annular space by means of an inner vessel 35, somewhat smaller in diameter than said vessel 34, and to cover the inner vessel with a gas-tight top 75. Rising through the vessel 35 is a pipe 36 on the same side as the gas-inlet 30 to the lower pan 28 and forming a gas-passage from the upper pan 29.

The upper or moving member of the gas-holder consists of a cylindrical vessel 37, closed at the top and opened at the bottom and of a diameter intermediate between those of the two vessels 34 and 35, so that it can pass down between them into the water in the annular space 37$^a$. It carries internally a vertical pipe 38, also closed at the top and open at the bottom, which passes down into an annular space 38$^a$, formed by two pipes 39 40, rising from the bottom sheets 33. The pipe 39 is a little smaller than the pipe 40, and the latter is closed at the bottom, while the inner one, 39, is continued in any convenient direction to the outside of the gas-holder, and thence to any locality convenient for the discharge of waste gas. The main gas-conduit pipe 36 passes through the crown-sheet 75 of the vessel 35 to form communication with the gas-reservoir inside the vessel 37. The annular water-space 37$^a$ between the vessels 34 and 35 is connected with that, 38$^a$, between the tubes 39 and 40 by cross-tubes 41, which insure correspondence between the water-levels in the two annular spaces and at the same time serve to support the tube 40 from the annular space 37$^a$. The moving member or vessel 37 of the gas-holder carries an outwardly-projecting arm or bracket 42, the function of which will be hereinafter explained. It also carries two or more rollers 43, which bear against the fixed vertical bars 44, and thus serve to guide the vessel 37 in its rise and fall. The vertical bars or posts 44 are connected at the top by horizontal bars 45, which serve to support the water-storage tank or cistern 46, which is entirely closed and which is supplied with water by means of the funnel 47, valve 48, and tube 49, the latter reaching nearly to the bottom of the cistern.

50 is a tube passing from the interior of the cistern 46, close to its top, to the interior of the upper pan 29, close to its bottom, and 51 is a water-pipe having cock 52, which pipe 51 connects the cistern 46 with the main part of the water-feeding system, which will now be described. The said feeding system consists of two parts—i. e., the main feeding system for ordinary operation and controlled directly by the flow of the gas and an auxiliary system for convenience in starting when the apparatus is first set up or has become exhausted of carbid or generating-water, or both, and for use also when it is desired to clean or make repairs to the main system.

The first-mentioned system consists, essentially, of the following parts: The pipe 51, leading from the water-cistern 46 and passing down a short way through the top of a small closed vessel 53, a pipe 54 leading from the interior of the upper carbid-holder 14 close to its top over toward the gas-holder, then down through the regulating-cock 56 and the stop-cock 57 to the gas-inlet 30, hereinbefore mentioned, and fitted with a small drain-cock 58 at its lowest point. From a point in the horizontal part of this pipe 54 is taken a branch pipe 55 downward through a stop-cock 59 and into the small vessel 53, only just passing through the top sheet of the latter. From another point in the pipe 54 below the regulating-cock 56 is taken another branch pipe 60, preferably enlarged, as shown, and bending downward and passing through the top sheet of the same vessel 53 and reaching to very near its bottom, the bottom end of said pipe 60 being left open.

61 is a small pipe passing from the interior of the pipe 60 down through the bottom of the vessel 53 over toward the generator, then up again and bending in and through the generator-casing 6 and connected to the annular feed-pipe 12, which is perforated to allow the escape of the feed-water. The end of the pipe 61, which is inclosed by the pipe 60, is preferably closed, and just below the end are small perforations 61$^a$ through the sides to allow communication from the interior of the pipe 60 to the interior of the pipe 61, care being taken that these perforations stand a little above the open end of the pipe 52, as shown. The pipe 60 and the vessel 53 form together the equivalent of an inverted siphon. The pipe 61 forms another inverted siphon, the exact proportions of which are immaterial, provided that the generator end stands at a lower level than the outlet end, as shown.

72 is a short pipe of comparatively large diameter open at both ends and passing through the top of the chamber 53, its lower end reaching to near the bottom of the said chamber and its upper end standing a short way above the top.

Figures 8, 9, 10, 12, 13:
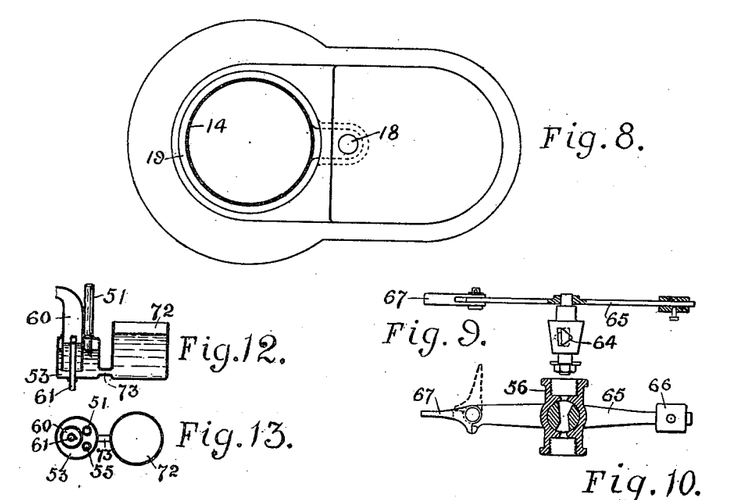
Figure 11:
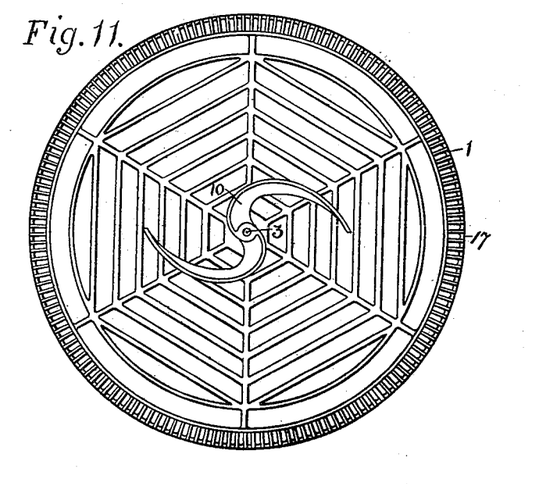
Fig. 11 is a plan of the grate-bottom, showing the carbid-distributer.

The above-mentioned regulating-cock 56 is shown in greater detail in Figs. 9 and 10 and is essentially an ordinary plug-cock; but being more for the purpose of throttling than that of stopping the passage through the plug is preferably made of triangular section in order to allow of finer graduation of the throttling, as shown at 64. The plug is operated by a cross-lever 65, carrying a weight 66 at one end adapted to bring the plug around to the full open position, in which position the weighted lever is held by a suitable limit pin or stop. The other end of the lever carries a tripping-finger 67, hinged to be adapted to lift freely out of line with said lever 65 when pressed upward and to fall down by its own weight or under pressure, if desired, into line with said lever 65 when allowed to fall; but it is capable of being thrown over into the position shown in dotted lines in Fig. 10, from which it will not fall back of itself, but must be replaced by hand. The outer end of this tripping-finger projects into the path of the bracket 42, as shown in Fig. 1, when in line with the lever 65, when the latter is in its uppermost position, and also through a certain length of its arc of travel downward, the point at which the end of the tripping-finger passes entirely out of the path of the bracket 42 being approximately that at which the cock 56 has just closed. Thus as the bracket 42 travels up it lifts the finger freely and passes it. The finger then falls back into the path of the bracket, and as the bracket comes down again it brings with it the tripping-finger 67, and thereby the lever 65, and gradually closes the cock as far as closed position, when the tripping-finger 67 escapes from the bracket 42 and weighted lever returns the plug to the full open position.

The auxiliary system consists of a branch pipe 62, leading from the water-pipe 51 and passing through a regulating-cock 63, similar and adjacent to the regulating-cock 56, and thence being led and connected to the top of the shorter outer leg of the inverted siphon 61, care being taken that there is no ascent in the course of the pipe from its junction with pipe 51 to its junction with 61.

The description given hereinbefore of the gas-regulating cock 56 may be considered as applying to the water-regulating cock 63, with the one essential exception that the uppermost position of the tripping-finger 70 corresponds in this case to the fully-closed instead of the fully-open position of the plug and that the cock-plug gradually opens as the bracket 42 brings the finger 70 down. The cock 63, lever 68, weight 69, and finger 70 are substantial duplicates of the parts shown in Figs. 9 and 10.

The management and operation of the apparatus are as follows: The generator is charged, as already described, the door 15 being left in the inward position—that is, closed—the upper chamber 14 being left full of carbid, the by-pass valve 20 being left in the position shown—that is, pressed hard against its upper seat, so as to prevent gas leaking to the outside, while allowing its passage into the annular space 19, and all outside doors or valves being closed gas-tight—the water-cock 52 is opened. This allows water to flow through the pipe into the closed chamber 53, its place in the cistern being taken by air or gas, which passes up the same pipe until the water-level in the chamber 53 rises to and closes the mouth of the pipe 51, when the air being shut off the water ceases to flow except what may be allowed by the expansion of the air already entered. In order to procure admission of the water to the generator, the cock 63 is momentarily opened by hand. This allows water to descend the pipe 62 from the cistern 46, its place being taken partly by the expansion of the air or gas already in the cistern, and, further, by air or gas passing up and entering by the same pipe 62 by which the water trickles down. This water fills the siphon 61 up to the level of the top of the shorter leg, when it passes into the annular distributing-pipe 12, and passing through the perforation in the said pipe into the trough 11, which carries it to the interior of the conical chamber of the generator and clear of the grating 4, where it trickles down through the outer skirt of the carbid contained therein. When a sufficient amount of water has been thus fed in by hand, the cock 63 is allowed to close and the normal action of the apparatus begins. The action of the water on the carbid produces acetylene gas, which passes through the conical grating 4 and upward to and through the opening 18, and thence to the annular passage 19, which distributes it around the bottom of the upper carbid-chamber 14, through which it ascends in close contact with the considerable bulk of carbid contained therein, and so to the outlet-pipe 54. The chemical action between the carbid and the water produces heat, which in its turn vaporizes a part of the water, and thus renders the gas moist. This vapor if allowed to pass into the service-pipes condenses into water and is liable to cause considerable trouble; but in my improved generator it is absorbed by the cool and dry carbid in the upper chamber 14 and a dry gas is delivered to the service-pipes. The moving member 37 of the gas-holder being at the start at its lowest position, the tripping-finger 67 is clear of the bracket 42 and therefore at its highest position to which the weight 66 will bring it, and the cock 56 is therefore fully open. The gas passes freely from the generator through the pipe 54 to the lower pan 28 under the gas-holder, where it is deflected alternately down into contact with the surface of the water in the pan 28 and up into contact with the bottom of the pan 29 by the partitions 71. Thus the gas travels to the farther side of the lower pan 28 and passes through the pipe 32 to the space over the surface of the water in the upper pan 29, over which it travels back until it reaches the rising pipe 36, which conveys it up into the space between the moving member 37 and the fixed member 35 of the gas-holder. As the gas enters its pressure raises the moving member 37 and is allowed to raise it until the bracket 42 has passed the tripping-finger 67, when it may be drawn off through the service-pipes. If the entering gas continues in excess of that drawn off, the chamber 37 continues to rise, and just before it reaches its highest limit the lower end of the pipe 38 emerges from the surface of the water contained in the annular space 38ᵃ between the pipe 39 and 40, allowing the gas to pass down between the pipes 38 and 40, then up between the pipes 38 and 39, then down through the vent-pipes 39, and so out to waste. As soon as the rate at which the gas is being withdrawn from the gas-holder has become in excess of that at which it is entering the chamber 37 begins to descend. When in its descent the bracket 42 reaches the tripping-finger 67, the cock 56 begins to close and throttle the gas. This causes a difference of pressure of the gas on the two sides of the cock 56, and since there is gas connecting between the one side and the space over the surface of the water in the chamber 53 by means of the pipe 55 and between the other side and the space over the water inclosed by the pipe 60 it follows that the former surface of water becomes depressed, while the latter rises, and that when the throttling has reached a sufficient degree the surface of the water inclosed by the pipe 60 will reach the perforations 61ᵃ in the upper end of the pipe 61 and water will then flow down the pipe 60 and pass into the feed-pipe 12 and thence to the carbid and generate gas. This increase in the generation of gas and of the passage of the said gas through the cock 56 further increases the difference in pressure on the two sides of the said cock 56, and consequently increases the feed of water into the generator, and consequently the generation of gas. This mutually-increasing process goes on until the generation reaches the same rate as the abstraction of the gas from the gas-holder. If then the rate of generation still further increases or the rate of abstraction is diminished, gas begins to accumulate in the gas-holder, the moving member rises, and the cock 56 opens and diminishes the inequality of pressure on the two sides, thus diminishing the rate of feed of the water and tending to establish equality again between the rate of generation and that of abstraction. During this process while the column of water inclosed by the pipe 60 stands at a height above that in the chamber 53, representing the difference in pressure of the gas on the two sides of the cock 56, the column of water inclosed by the open pipe 72 obviously stands at a height above that in the chamber 53, representing the greater difference between the greater of those two pressures. If now the withdrawal of gas from the holder is stopped, the moving member 37 rises and the cock 56 opens fully under the influence of the weight 66, stopping the throttling of the gas, and thereby stopping the feeding of the water. The water already in the generator continues to generate gas, however, and continues to raise the moving member 37. As the immersion of the moving member in the water contained in the lower part of the gas-holder diminished its effective weight increases slightly, and consequently the pressure of gas in the whole apparatus increases slightly. Consequently the column of water inclosed by the pipe 72 increases in height. This tends to diminish the height of the water in the chamber 53 and uncovers the lower end of the pipe 51 and allows gas to enter the cistern 46 and water to run down the same pipe, preserving the water-level stationary in the chamber 53. When the moving member 37 of the gas-holder reaches the top of its course, the lower end of the pipe 38, which it carries, emerges from the surface of the water contained in the pipe 40 and any gas which subsequently enters the holder escapes through the vent-pipe 39, as before described. If there is no withdrawal of gas for a considerable time, the water in the generator is all taken up, the generation stops, and the moving member 37 stops close to the top of its movement, with the lower end of the pipe 38 just closed by the water in the pipe 40. Then when the withdrawal of gas is again started the moving member descends, increasing its immersion and diminishing the gas-pressure down toward the normal, thus causing the level of the water inclosed by the pipe 72 to fall. This water reëntering the chamber 53 raises the level of the inclosed water until it reaches the perforations in the feed-pipe 61, when it overflows into the said feed-pipe and starts the generation of gas. Thus when the moving member in its descent reaches a position at which the bracket 42 comes into engagement with the tripping-finger 67 and begins to close the cock 56 there is already gas passing the said cock, so that the throttling of the gas with the resultant water-feeding process at once begins.

One difficulty with an apparatus of this kind is to effect a distribution of the water over the carbid, avoiding a constant dripping in one place, by which a limited column of carbid becomes entirely decomposed, and afterward the water goes on trickling through the ash and not generating gas. Another important point is to separate the ash from the carbid, leaving a considerable thickness of comparatively clean carbid in the path of the trickling water. A long distributing pipe or trough, such as I use, is apt to be set a little out of the level, in which case the water drops from only one or two holes and reaches only a small proportion of the carbid in the generator. It is to attain these two objects more effectively that I use a conical revolving grate. When the bottom 1 and the conical sides 4 of the grate are made in one and revolve together around a fixed cross-arm 10, the agitation of the carbid effectively separates the ash and discharges it through the sides and the bottom of the grate. It also moves the carbid around in relation to the grate, and, thirdly, the chances are very large that after revolving the grate comes to rest at a position different from that before being revolved. Consequently it is practically certain, even if the water is dropping from only one point in the distributing pipe or trough 11, that a fresh bulk of carbid comes into action at every operation of the revolving mechanism, and since the water is fed in at a considerable height above the bottom of the grate this bulk is a considerable one and will last a comparatively long time. When the sides 4 and the bottom 1 of the grate are made separate, as shown, and revolved in opposite directions, the rolling and rubbing action of the carbid, instead of being confined to the bottom of the grate, also takes place between the sides and the carbid, and to a certain extent mutually between the separate lumps of the carbid, so that the separation of the ash becomes more efficient. The drawing Fig. 1 is arranged with a view to showing the general method of construction and principle of working rather than actual or best proportions, and it is advisable to make the pipe 72 of greater diameter in proportion to the chamber 53 than shown, in order that with a small variation in gas-pressure a sufficient amount of water may be stored in and drawn from it to amply supply the automatic starting process just described. An alternative construction attaining this object is shown in Figs. 12 and 13, where the pipes 60, 51, and 55 are accommodated by a small chamber 53, while the large pipe 72 is outside of this chamber, but connected to it by pipe 73 below the water-level, the chamber 53 and pipes 73 and 72 thus again constituting an inverted siphon. It may be noticed that the position in Fig. 1 given to the pinion 22 and hand-wheel 23 for discharging ash from the ash-pit is different from that given to them in Fig. 2. This is also merely for the purpose of making Fig. 1 more complete and lucid, and the exact position of these parts is not material. Suppose now that the carbid in the generator has become exhausted and that gas is being drawn off. The moving member 37 descends and closes the cock 56; but as no gas is passing through the cock no throttling ensues, and consequently no feeding of water to the generator and the moving member 37 may remain all night at the position of holding the cock 56 at the water-feeding position without feeding any water into the generator, where it could only accumulate and cause trouble, and to start again it is only necessary to close the stop-cock 57, recharge the generator with carbid, as already described, and momentarily open the cock 63 to allow a little water to enter the generator. This preliminary feeding of water by hand may also be effected by momentarily opening the valve 48 and allowing a little air to enter the cistern 46 or by opening an air-cock, which can be placed in the pipe 50 for that purpose, or by pouring a little water into the pipe 72. If instead of stopping at the intermediate position the moving member 37, through the continued abstraction of gas, passes down to the bottom of its course, the bracket 42 slips off the tripping-finger 67, and the only difference from the case last described is that the preliminary feeding by hand must be sufficient to fill the holder until the bracket 42 rises past the tripping-finger 67 and the latter falls back into the position shown in Fig. 1.

In case it is desired to clean or repair the water feeding and regulating system hereinbefore described or to throw it out of work permanently, it is only necessary to throw back the tripping-finger 67 to the position shown for the tripping-finger 70 in Fig. 1 and to throw down finger 70 to the position shown for finger 67, when the cock 63 becomes automatically operative through the motion of the bracket 42, while the cock 56 remains wide open, allowing free passage of gas from the generator to the holder. The passage through the plug of the cock 63 is so arranged in relation to the lever 68 that when the tripping-finger 70 is in its uppermost position the passage is closed and opens gradually as the finger is pulled down by the bracket 42. Thus, with this system added, whenever the moving member 37 is above a certain fixed point no water is fed into the generator.

When it falls below that position, water feeds in at a rate depending entirely upon the position of the bracket 42 or, in other words, upon the amount of opening through the cock, and equalization is established between gas flowing in from the generator and gas flowing out to the service-pipes at a point between the uppermost position of the finger 70 and that at which the bracket 42 passes out of contact with it, allowing it to return to its uppermost position, the position of that point depending upon the rate at which the gas is being drawn from the holder. If, however, the carbid becomes exhausted in the generator and the gas continues to flow from the gas-holder, that equalization does not become established, and the moving member 37 falls to the bottom, allowing the cock 63 to be closed by the weight 69, in which case after recharging the generator with carbid the water must be fed by hand sufficiently to raise the moving member until it passes the tripping-finger 70, as hereinbefore described. When this system is in use, the water-cock 52 and gas-cock 59 may be closed for the purpose of throwing out the automatic water-feed-starting system hereinbefore described, and the valve 48 may be opened to allow of air entering the cistern 46 freely instead of compelling gas to pass up the pipe 62 as the water runs down the same.

The object of siphoning or trapping the pipe 61 is to prevent gas from passing through it from the generator to the gas-holder, this being effected by the water entrapped in the siphon.

When the water-cistern 46 is to be replenished, care should be taken that the water-cocks 52 and 63 are closed. Then the valve 48 can be opened and water poured through the funnel 47. The gas contained in the cistern is pushed by the entering water through the pipe 50, whence it bubbles up through the water in the pan 29 and thence escapes through the pipe 36 into the gas-holder. When the water has filled the cistern 46, it overflows by the same pipe 50 into the pan 29, thence it overflows by the pipe 32 into the pan 28, and thence by the outlet 31 to waste. Thus the water in the two pans 28 and 29 is kept at constant levels without any special operation.

Figure 4:
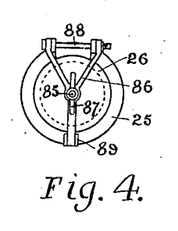
Fig. 4 is a front elevation of this gas-tight door for closing the ash-pit.

Referring to Figs. 3 and 4, which show the gas-tight door, which in some cases is used both on top of the generator and on the ash-pit, but in this case I have only shown on the latter, 25 is the neck-piece fixed to the casing 7 and forming the opening for discharge of ash. 26 is the door proper carried on the end of a pin 85, which passes through the cross-bar 86, in which it is threaded, and is fitted with a handle 87 at its outer end. The cross-bar 86 is hinged at one end by rod 88 to the neck-piece 25 and at the other carries a hooked link 89, adapted to engage with a lug 90 on the same neck-piece, and carried by the door 26 is a rubber washer 91, adapted to be pressed between the said door and outer rim of the neck-piece 25. To close the door gas-tight, it is brought around on its hinge into the position shown, the link 89 is thrown into engagement with the lug 90, and the pin 85 is screwed up tight, the connection of the pin 85 to the door 26 being such as to allow revolution of the former relatively to the latter.

Figures 5, 6, 7:
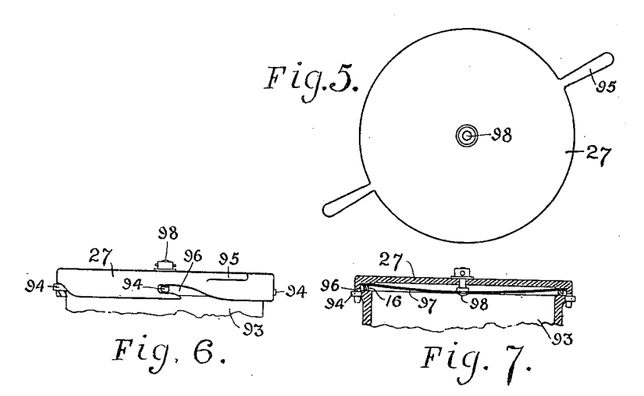

Figs. 5, 6, and 7 show the gas-tight door, which in other cases I also use both on top of the generator and on the ash-pit, but in this case have only shown on the latter. 93 is the neck-piece fixed to the generator and carrying projecting pins or lugs 94. 27 is an outer stiff plate having handles 95 and a rim adapted to pass over the end of the neck-piece 93 and having inclined openings 96, into which the lugs 94 can enter. 97 is a light plate carried by the plate 27 by means of a pin 98, adapted to revolve in the said plate 97, but fixed with a gas-tight joint in the plate 97. Said plate 97 carries a compressible washer 16, adapted to be pressed between said plate and the outer rim of the neck-piece 93. To close the door gas-tight, it is placed with the openings at 96 over the lugs 94 and turned left-hand, when said lugs bearing on the lower sides of said openings draw the door down, compressing the washer 16.

Figure 14:
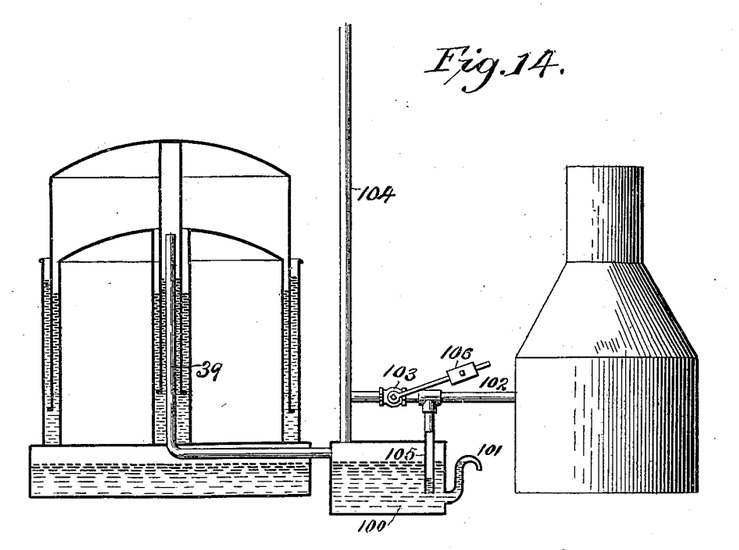
Fig. 14 is a sectional elevation showing the safety apparatus.

In Fig. 14 the pipe 39 is connected to a box 100, so that any water that may accumulate in the pipe 39 will drain off into the said box. The box 100 has an overflow 101, which is sealed by the water contained in the said box and which determines the water-level and maintains it at a point below the entrance of the pipe 39. A branch pipe 102 leads from the lower part of the gas-generator through a cock 103 into a vent-pipe 104, and from the branch pipe 102 leads a pipe 105, which enters the box 100 and terminates below the water-level. If the working pressure of the gas is measured, say, by a column of three inches of water, the bottom of the pipe 105 may be about four and one-half inches below the surface of the water. The cock 103 is normally kept shut by a weight 106 or by a spring. If the gas-cock 56 between the generator and holder is inadvertently left shut while gas is generating, or if the movable member of the gas-holder becomes jammed or otherwise prevented from free operation, the gas cannot rise to a dangerous pressure, as any overpressure will depress the water in the pipe 105 till it reaches a pressure to displace four and one-half inches, whereupon the gas will bubble through the water in the box 100 and escape through the vent-pipe 104.

When the generator has been recharged with carbid, it contains a considerable amount of air. This should not be allowed to go into the gas-holder and may be discharged into the atmosphere either by leaving the cock 103 shut and allowing the generator to blow the air through the pipe 105 and box 100 to vent 104 or, preferably, if there is gas in the holder, by opening the cock 103, when the gas will blow back through the generator and force the air in front of it directly to the vent 104.

In speaking of the lower member of the gas-holder and the pans 28 and 29 as containing water I desire it understood that I do not limit myself to this liquid, but may use any other liquid adapted to the purpose in view. Thus any oil may be used which will not have a deleterious effect on the gas; but if oil be used in the pans 28 and 29 the overflow from the water-storage cistern 46 must not be carried to them as described. Glycerin or salt may be dissolved in the water for the purpose of retarding freezing, or a suitable acid may be dissolved in the water in the pans to further purify the gas.

Having thus described my invention, what I claim is—

1. In an apparatus for the manufacture and storage of acetylene gas, the combination with the generator and gas-holder of means of throttling the gas as it flows from the former into the latter and means of causing the differential pressure produced by that throttling to feed water automatically to the carbid in the generator.

2. In an apparatus for the manufacture and storage of acetylene gas, the combination with a generator, a gas-holder, and gas communication between the two, of a valve or cock adapted to close or open such communication, means of operating such valve or cock from the motion of the moving member of the gas-holder, two gas connections from the aforesaid gas communication, one from one side of the said valve or cock to one end of an inverted siphon-like device containing water, the other from the other side of said valve or cock to the other end of said siphon, and water connection adapted to convey overflowing water from one leg of the siphon to the carbid in the generator.

3. In an apparatus for the manufacture and storage of acetylene gas, the combination with a gas-generator, a gas-holder, an inverted siphon-like device containing water, means of throttling the gas in its passage from the generator to the holder, means of causing the differential pressure due to the said throttling to elevate the surface of the water in one leg of said siphon, means of preserving the surface of water in the other leg at an approximately constant level, and means of conducting to the carbid in the generator the surplus of water above a certain predetermined point in the first-mentioned leg.

4. In an apparatus for the manufacture and storage of acetylene gas, a gas-generator, a gas-holder, means of throttling the gas in its passage from the former to the latter, means of causing the differentiation of pressure due to said throttling to feed water into the generator from a suitable vessel, in combination with a head of water at a higher level than said small vessel, and a water connection leading from said cistern to the level of the surface of the water in the small vessel, for the purpose of preserving the said surface of water at a constant level; said storage-cistern being air-tight; substantially as described.

5. In an apparatus for the manufacture and storage of acetylene gas, a gas-generator, a gas-holder, means of throttling the gas as it passes from the former to the latter, means of causing the differential pressure produced by said throttling to feed water automatically to the carbid in the generator, in combination with means adapted for alternative operation for supplying water direct from a water-supply to the generator; substantially as described.

6. In an apparatus for the manufacture and storage of acetylene gas, a gas-generator, a gas-holder, means of throttling the gas as it passes from the former to the latter, means of causing the differential pressure produced by said throttling to feed water automatically to the carbid in the generator, in combination with means adapted for alternative operation for supplying water direct from a water-supply to the generator, and means of regulating such supply automatically from the motion of the moving member of the gas-holder; substantially as described.

7. In an apparatus for the manufacture of acetylene gas, a generator comprising a carbid-receptacle of approximately conical shape and inclosed in a casing, the coned sides and the bottom being made separate and both revoluble from the outside of the casing, and means of feeding water to the carbid.

8. In an apparatus for the manufacture of acetylene gas, in combination with a generator and means of feeding water to the carbid contained therein, one or more cooling or purifying pans, a water-storage cistern at a higher level and an overflow connection from said cistern to said pans.

9. In an apparatus for the manufacture of acetylene gas, a main carbid-holder, a water-supply therefor, a second carbid-holder above the said main carbid-holder, a carbid-supporting door between said main and second carbid-holders, a passage for gas from said main carbid-holder to said second carbid-holder, and a gas-passage leading from said second carbid-holder to the gas-holder, substantially as described.

10. In an apparatus for the manufacture of acetylene gas a generator consisting of an outside conical shell or casing, an open conical casing containing within said outside shell or casing means for feeding carbid to the interior of the said interior conical casing, and means for revolving said interior casing on its vertical axis, substantially as described.

11. In an apparatus for the manufacture of acetylene gas, a generator consisting of an outside shell or casing, another open casing contained within the said outside shell or casing, means for feeding carbid to the interior of the said open inside casing, a bottom or support for the carbid and a projection secured to said bottom for spreading the carbid, substantially as described.

12. In an apparatus for the manufacture of acetylene gas, a generator comprising a carbid-receptacle, means for feeding water to the carbid therein, an ash-pit having a revoluble bottom, means for revolving said bottom, an opening for discharging the ash from said ash-pit, a spiral deflecting-flange at the upper surface of said bottom attached at its inner end to the shaft of the bottom and fixed at its outer end to the casing, substantially as described.

13. In an apparatus for the manufacture of acetylene gas, a gas-generator comprising an outside gas-tight casing, an upwardly-tapering and hollow grating held within the said gas-tight casing, a grating forming the bottom of said tapering grating for supporting the carbid, a water-distributer surrounding the tapering grating above its base, and means for supplying water to said water-distributer, substantially as described.

JAMES E. LYTLE.

Witnesses:
K. HIRSCH,
S. MOWATT.